(12) United States Patent
Chatrenet et al.

(10) Patent No.: US 9,652,127 B2
(45) Date of Patent: May 16, 2017

(54) DEVICE AND METHOD FOR REMOTE INTERACTION WITH A DISPLAY SYSTEM (71) Applicant: AIRBUS OPERATIONS (S.A.S.), Toulouse (FR)

(72) Inventors: Nicolas Chatrenet, Colomiers (FR); Eric Petit, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 173 days.

(21) Appl. No.: 14/054,338

(22) Filed: Oct. 15, 2013

(65) Prior Publication Data

US 2014/0108947 A1 Apr. 17, 2014

(30) Foreign Application Priority Data

Oct. 17, 2012 (FR) ...................................... 12 59898

(51) Int. Cl.
*G06F 3/0484* (2013.01)
*G06F 3/0481* (2013.01)
*G06F 3/0488* (2013.01)

(52) U.S. Cl.
CPC .......... *G06F 3/0484* (2013.01); *G06F 3/0481* (2013.01); *G06F 3/0488* (2013.01); *G09G 2380/12* (2013.01)

(58) Field of Classification Search
CPC ................................................. G09G 2380/12
See application file for complete search history.

(56) References Cited

U.S. PATENT DOCUMENTS

| | | | | |
|---|---|---|---|---|
| 8,264,376 B1* | 9/2012 | McLoughlin | .......... | G01C 23/00 340/945 |
| 8,725,318 B1* | 5/2014 | McCusker | ............. | H04L 67/12 701/3 |
| 2010/0001132 A1* | 1/2010 | Detouillon | ............. | G01C 23/00 244/118.5 |
| 2010/0325574 A1 | 12/2010 | Olsen | | |

(Continued)

FOREIGN PATENT DOCUMENTS

| | | |
|---|---|---|
| EP | 0 582 929 | 9/1993 |
| EP | 2 372 527 | 10/2011 |
| GB | 2 451 274 | 1/2009 |

OTHER PUBLICATIONS

French Search Report for Application No. 1259898 dated Jun. 12, 2013.

*Primary Examiner* — Amy Ng
*Assistant Examiner* — Tan Tran
(74) *Attorney, Agent, or Firm* — Jenkins, Wilson, Taylor & Hunt, P.A.

(57) ABSTRACT

A mobile device for remote control and interaction with a screen of an aircraft cockpit display system is able to display at least one window including at least one control widget and/or at least one signal providing information concerning the status of an on-board system of the aircraft. This device is configured to download at least one window displayed on the screen so as to interact remotely with the interactive widget contained in the downloaded window by the said mobile control and interaction device and/or to display the signal providing information concerning the status of the aircraft's on-board system on the said mobile control and interaction device.

12 Claims, 9 Drawing Sheets (56) References Cited

U.S. PATENT DOCUMENTS

| | | | |
|---|---|---|---|
| 2011/0083111 A1* | 4/2011 | Forutanpour | G06F 1/1694 |
| | | | 715/863 |
| 2012/0139857 A1* | 6/2012 | Terebkov | G06F 3/04883 |
| | | | 345/173 |
| 2012/0208514 A1* | 8/2012 | Park | G06F 3/0484 |
| | | | 455/418 |
| 2012/0311038 A1* | 12/2012 | Trinh | H04W 4/206 |
| | | | 709/204 |

* cited by examiner

DEVICE AND METHOD FOR REMOTE INTERACTION WITH A DISPLAY SYSTEM

TECHNICAL FIELD

The present invention relates to a mobile device for remote control and interaction with an aircraft cockpit display system including multiple screens able to display at least one window, also called format, including at least one control widget and/or at least one signal providing information concerning the status of an on-board system of the aircraft.

The invention also relates to a method for remote interaction with an aircraft cockpit display system including multiple screens able to display at least one interaction window, including at least one control widget and/or at least one signal providing information concerning the status of the aircraft's on-board system.

The invention also relates to an aircraft including such a device.

The invention applies in particular, but not exclusively, in a avionics display system of a pilot's seat in an aircraft cockpit.

The invention also relates to a computer program including instructions to implement the method according to the invention.

BACKGROUND

In current avionics systems (navigation, piloting, mission management, communications management, etc.), information is displayed on several separate physical screens positioned in front of the pilots' seats over an extensive area of the cockpit. These screens are connected to on-board computers which continuously analyse data from various sensors distributed throughout the aircraft and command data provided by the crew members, and they produce complex information for the crew members. Each cockpit screen may include several windows, also called formats, which may have widgets sending data to separate applications. The pilots must manipulate one or more cursors on the different screens, in order to select an interactive element or to designate one or more widgets. To this end the crew members use one or more devices for indirect interaction with the different screens, such as for example a keyboard, a trackball or a touchpad.

In addition to the multiple indirect interaction devices the pilots may have to fit devices of a given type, which may take different forms (a keyboard, for example), so as to interact with different windows displayed on the screens requiring different forms of control. The large number of types of interaction devices leads to an additional workload to identify the interaction device appropriate for a given window.

In addition, depending on the operational context (flight phase), it may happen that certain indirect interaction devices are not kept in the preferred interaction area facing the pilot where the pilot has optimal control and comfortable interaction conditions, in order to keep this area free from all obstacles. For this reason, certain interaction devices are positioned on retractable shelves which slide under the instrument panel. This results in reduced interaction efficiency with display formats using these specific interaction devices, which must be manipulated using generic devices.

Furthermore, these devices are not suitable for natural user interfaces (NUI), but rather mainly for graphical user interfaces (GUI). This prevents these interfaces from changing into natural graphical interfaces allowing the simplicity, user efficacy and learning to be improved. A known solution to provide direct and natural interaction with the displayed information consists in using touchscreens. However, the display windows are extended over the surface of the cockpit's main instrument panel and may be too far from the position of the pilot, often obliging them to change their posture in order to reach the different displayed windows. This impairs the ergonomics and efficiency of the pilots' actions.

The aim of the invention is to palliate the disadvantages of the prior art described above by a new device for shared interaction with a display system which can easily be adapted to the many display windows, so as to replace the multiple interaction devices used in the prior art, and to improve the ergonomics and efficiency of the interactions with the display system.

SUMMARY OF THE INVENTION

The present invention recommends a mobile device for remote control and interaction with an aircraft cockpit display system including multiple screens able to display at least one window including at least one control widget and/or at least one signal providing information concerning the status of an on-board system of the aircraft.

The device according to the invention includes means to download at least one window displayed on at least one of the screens of the said display system so as to interact remotely with the interactive widget contained in the downloaded window by means of the said mobile control and interaction device and/or to display the signal providing information concerning the status of the aircraft's on-board system on the said mobile control and interaction device.

The device according to the invention also includes a touchscreen and means to transfer the downloaded window to at least one second mobile control and interaction device so as to interact remotely with the interactive widget contained in the said window from the said second mobile control and interaction device, and/or to display the signal providing information concerning the status of the aircraft's on-board system on the said second mobile control and interaction device.

The said window is preferentially downloaded from the mobile control and interaction device. This operation may be accomplished, for example, by a first sliding movement of the user's fingers on the touchscreen of the mobile device; where the first said sliding movement is defined by the initial position and the final position of the window in question.

According to another characteristic of the invention the said window may be exchanged indiscriminately between the mobile control and interaction device, the cockpit screen and the second mobile control and interaction device. This exchange is controlled by a second specific sliding movement taking into account the initial and final relative positions of the display surfaces of the window in question.

The said window is downloaded via a configuration man-machine interface giving access to all the configuration actions to download a window which may be displayed on the display system screen of an aircraft cockpit, or on a second mobile control and interaction device.

By means of the device according to the invention, the pilots have a mobile means, which can be adapted to interact remotely with different types of windows which are displayed on the different screens of the aircraft's cockpit display system, and also with surfaces of the HUD type (heads-up display), or any other window which may be displayed outside the instrument panel.

The device according to the invention also includes at least one control means enabling a cursor to be moved within a display window and also from one window to another. This control means is, for example, a pointer device and/or a keyboard to control the remote interaction with an interactive widget contained in the window displayed on the screen.

The method according to the invention includes a step consisting in transferring at least one window displayed on the screen of the aircraft's cockpit display system to a mobile control and interaction device so as to interact, remotely, from the said mobile control and interaction device, with the interactive widget contained in the transferred window, and/or to display the signal providing information concerning the status of the aircraft's on-board system on the said mobile control and interaction device.

In a preferred embodiment, the method according to the invention also includes a step consisting in transferring the said downloaded window from the mobile control and interaction device to at least one second mobile control and interaction device, so as to interact remotely, from the said second mobile control and interaction device, with the interactive widget contained in the transferred window, and to display the signal providing information concerning the status of the aircraft's on-board system on the said second mobile control and interaction device.

In a particular application of the invention the method is used to control remotely piloting and display functions of the instrument panel of an aircraft.

BRIEF DESCRIPTION OF THE DRAWINGS

Other characteristics and advantages of the invention will become clear from the following description, which is given as a non-restrictive example, with reference to the appended figures, in which.

DETAILED DESCRIPTION

Figure 1:
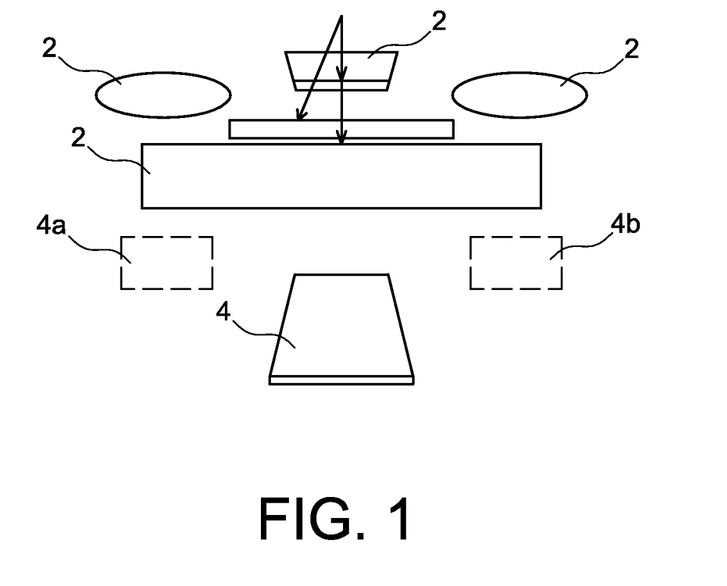
FIG. 1 illustrates schematically an architecture including a mobile device for remote control and interaction according to the invention.

The invention will be described, by reference to FIG. 1 illustrating schematically a cockpit of an aircraft including several screens connected to an avionics control system and to an information system. These screens can display interfaces of the flight instruments; in this case these are screens of the CDS (Cockpit Display System) type, or can interface with a computer documentation and flight information system; in this case these are EFB (Electronic Flight Bag) screens. These screens may be fixed or mobile cockpit screens. In particular, screens of the CDS type may be fixed screens, and screens of the EFB type may be mobile screens. Each screen enables different applications or formats to be displayed in accordance with the type of data to be presented to the user, through windows or interactive elements displayed on the screen. Movements within these display formats are obtained by means of a cursor enabling a widget on a format to be selected. The cursor movements are controlled, by a trackball or a touchpad, for example. An activation device enables a predefined action for a widget designated by the cursor to be activated. A mobile remote control and interaction device 4, called DMCI in the remainder of the description, is given to each member of the crew. This device is able to download a format displayed on one of screens 2 or on another DMCI (4a or 4b), and to transfer this format to other DMCIs 4a and 4b. By this means the user may control remotely the entire environment of the cockpit, and display all sorts of information available in the flick deck concerning a pending operation. These commands and this information relate to all the equipment of the cockpit and all the functions concerning the various crew tasks (navigation, piloting, systems management, mission management, communication, etc.).

Figure 2:
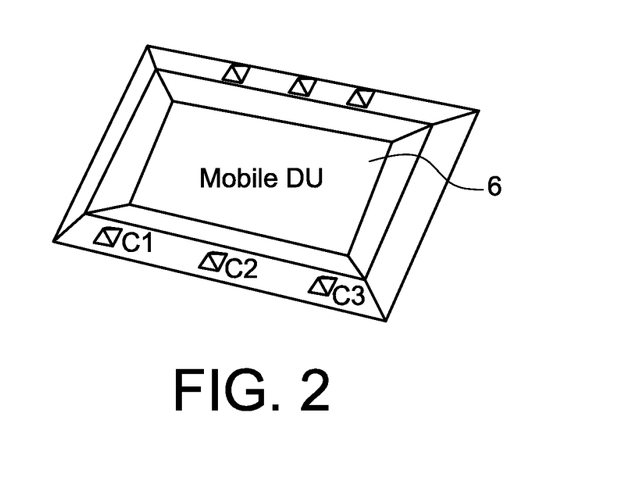
FIG. 2 illustrates schematically an embodiment of a mobile remote control and interaction device according to the invention.

FIG. 2 illustrates schematically an example embodiment of a DMCI 4 according to the invention. It forms an integral part of the avionics command and control system. To this end, a continuous data exchange is provided between the avionics command and control system and DMCI 4. This continuous data exchange may be provided either by a wire or by wireless technology.

In a first embodiment, DMCI 4 is connected to the avionics command and control system by a wire such that it is able not only to support continuous data exchange, but also to receive permanent electrical power. This power may also be obtained by a battery integrated in DMCI 4. The wire providing the continuous data exchange and the permanent electrical power is preferentially integrated in DMCI 4.

As can be seen in FIG. 2, DMCI 4 includes a touchscreen 6 with multi-touch functionality (for example, several fingers, hands, parts of fingers, nails, etc.) supporting complex gestures appropriate for the interactions in the flight deck such as the handling of electronic cards. DMCI 4 can display a virtual keyboard allowing the user to enter textual data and/or numerical data. This virtual keyboard preferentially has haptic characteristics improving interactions for the supply of non-visual information, allowing "blind use".

DMCI 4 also includes additional control buttons giving direct access to certain functions. These control buttons are preferentially non-virtual and are used principally to accomplish actions intended to manage screen configuration. This consists, for example, in accessing the configuration MMI rapidly and effectively (giving access to all the configuration operations) (C1), in rapidly recovering the last format displayed, or in rapidly deleting the format displayed at the end of the interaction with the interactive element of this format (C2). The control buttons are also used to accomplish interactions with interactive widgets displayed in a format. This consists, for example, in rapidly accessing indirect interaction means (trackpad-type interaction means) (C3). Various settings, such as brightness, and on and off, may be controlled by the control buttons. Some of these control buttons may be multiplexed in a single control (C2/C3) to limit their number. It should be noted that direct access to the functions described above may be obtained by voice control. DMCI 4 thus replaces several indirect interaction means, and shares them in a single, centralised remote control device. This sharing enables the ergonomics and effectiveness of the crew members' actions to be improved, notably by reducing encumbrance in the cockpit. In addition, DMCI 4 takes advantage of the use of a natural user interface (NUI), allowing direct touch interaction, whatever the cockpit's geometry, by this means facilitating accessibility of the information displayed on the screens of the cockpit to all the crew members; and DMCI 4 thus implements a remote control function.

To interact remotely with the control functions, DMCI 4 recovers the control and display formats including the interactive widgets and/or the status information which the user wishes to use. These formats are preferentially recovered by gestures of the user causing a specific movement of DMCI 4 relative to the screen displaying these formats. This screen may be one of screens 2 of the cockpit instrument panel, or again a mobile screen of another DMCI 4a or 4b. Due to the mobility of DMCI 4, the gestures used for the remote control function take account of the position and orientation of DMCI 4 in the cockpit, such that the remote control function remains available whatever the operational context.

Figure 3:
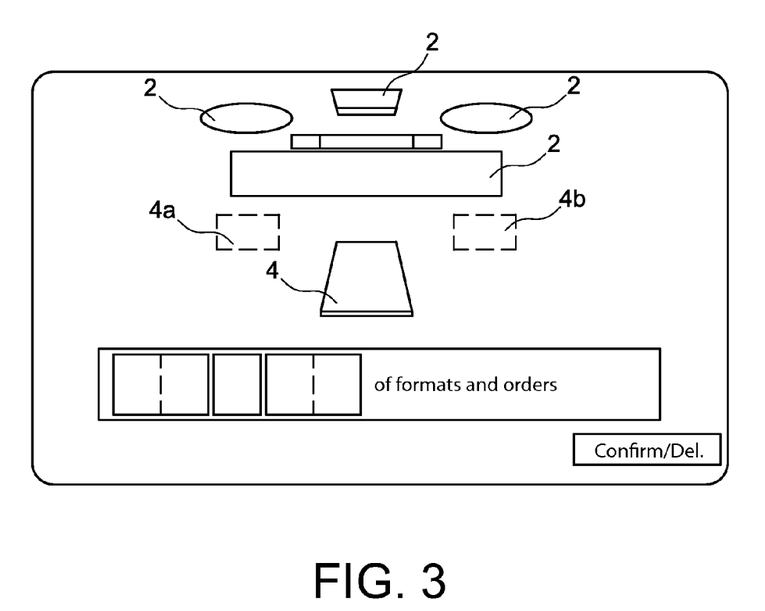
FIG. 3 illustrates a visual interface implemented on the mobile remote control and interaction device.

Every configuration action (transfer, request for a display format on one or more display surfaces, redimensioning of a format, deletion of format) is accomplished via a configuration interface giving a global outline of the configuration of the flight deck and access to all the configuration actions. A representation of this interface is illustrated by FIG. 3. DMCI 4 is preferentially fitted with movement sensors which enable its position in the cockpit to be determined continuously, in order to interpret correctly the gestures of the user whatever the relative position of DMCI 4 relative to the other fixed or mobile screens in the cockpit.

In another embodiment the movements and relative position of DMCI 4 relative to the other fixed or mobile screens in the cockpit are detected by a device external to DMCI 4 consisting, for example, of one or more cameras distributed in the cockpit and in other areas of the aircraft, and connected to the avionics control system and to the information system.

Due to its mobility and its ability to display different types of formats, DMCI 4 assists each crew member to control all the current tasks of the different flight phases in optimal comfort conditions.

Transferring a window displayed on one of screens 2 to DMCI 4 is described below with reference to FIGS. 4 to 6. This transfer may be activated by a touch interaction with specific gestures on a screen 2, or locally on DMCI 4. These gestures are sliding movements defined by the initial position and the end position of the format which the user wishes to transfer.

In a particular embodiment, these gestures are accomplished by using at least three fingers, in order to distinguish the transfer action from the actions of control or display, which are given by one or two fingers.

Figure 4:
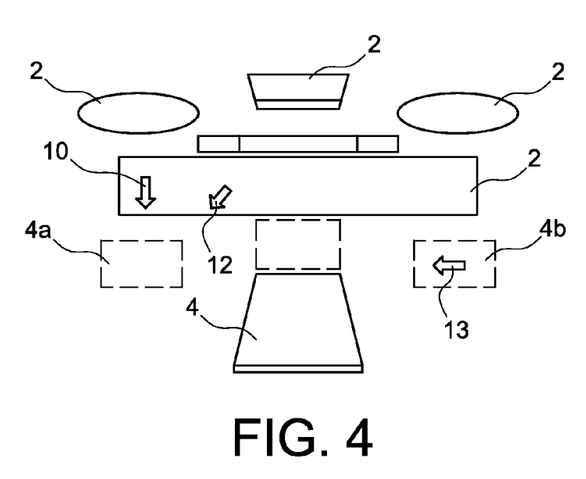
FIGS. 4 to 6 illustrate schematically the use of a mobile remote control and interaction device of FIG. 2 as a remote control device.

In FIG. 4, arrows 10, 12 and 13 illustrate the activation of the transfer from a format to DMCI 4 from a screen 2, or from another DMCI 4b by a touch interaction on this screen 2 or this DMCI 4b.

Figure 5:
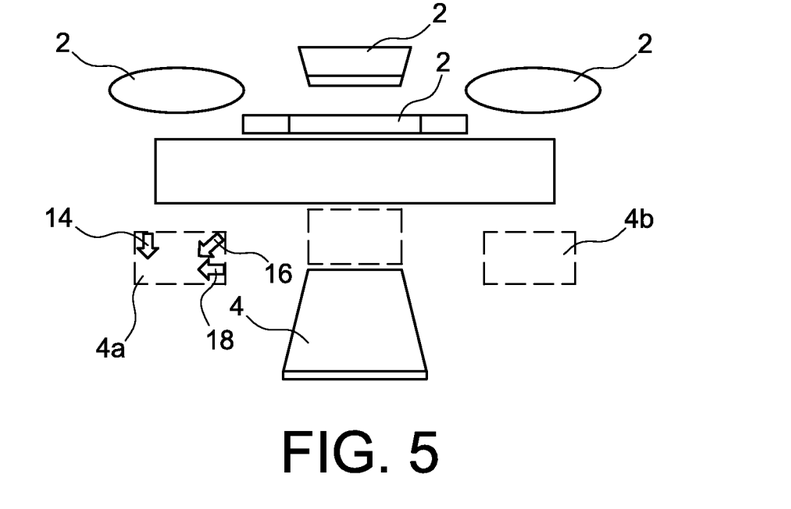
Figure 6:
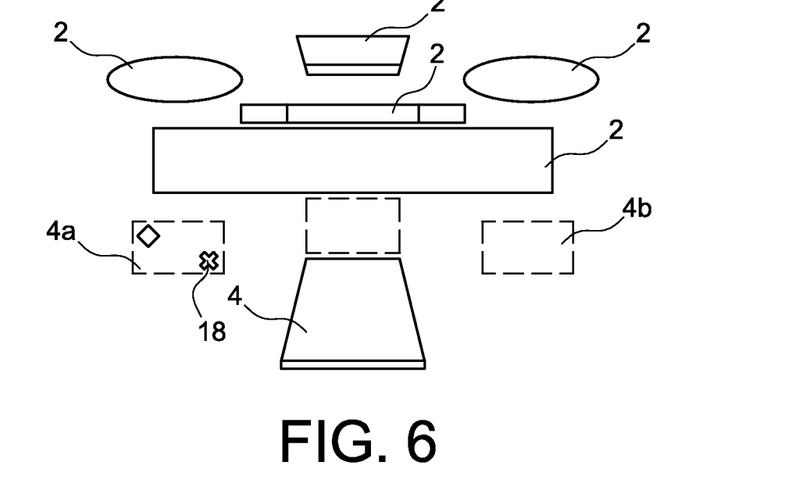
Figure 7:
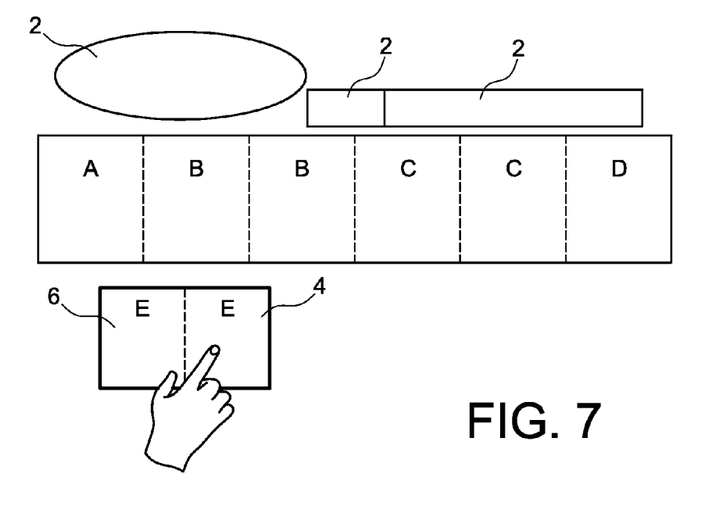
FIGS. 7 to 12 illustrate schematically a preferred method of transferring a format from a display screen to a mobile remote control and interaction device according to the invention.

In FIG. 5, arrows 14, 16 and 18 illustrate the activation of the transfer of a format directly on to DMCI 4a. This latter mode enables a touch interaction on screen 2 or on DMCI 4b to be avoided.

It should be noted that transferring a control or display format from screen 6 of DMCI 4 does not modify the transferred format. It remains displayed on screen 2 or on second DMCI 4b.

Deletion of the format transferred from screen 6 of DMCI 4 is optional and may be accomplished by control button C2 (represented schematically by a cross 18 in FIGS. 4 and 6) which is dedicated to this end, i.e. by a specific gesture in the shape of the letter S (for delete), for example. This gesture must preferentially be made with at least three fingers.

Symbol 19 (lozenge) illustrates schematically a button enabling a given format or any other control to be requested.

Figure 8:
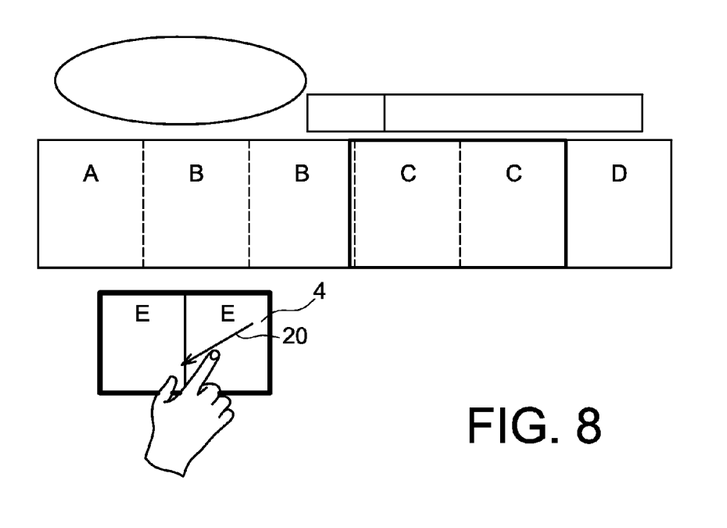
Figure 9:
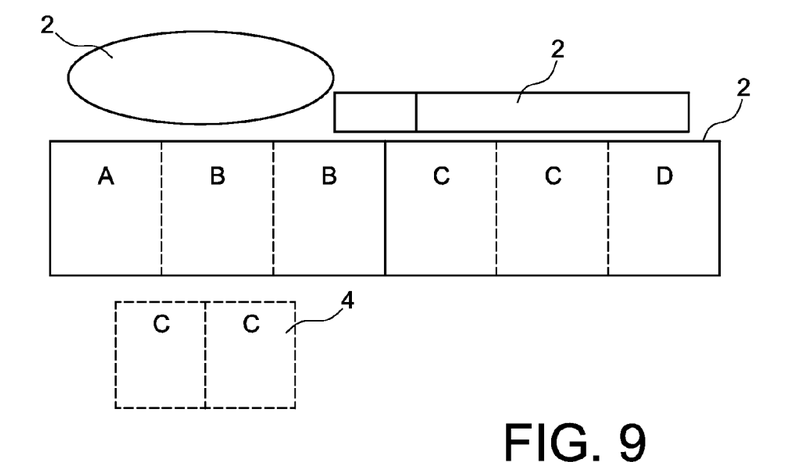

FIGS. 7 to 12 illustrate schematically the principle for transferring to DMCI 4 a format C chosen from among multiple formats A, B, C, D and E displayed on a remote screen 2. In this example, format E is the last format displayed on screen 4 of DMCI 4 and the user wishes to replace it by format C. To accomplish this they touchscreen 6 with at least three fingers to initiate the transfer operation. The user then makes a sliding movement in the direction opposite the position of format C, as illustrated in FIG. 8 by arrow 20. This gesture causes format C to be displayed on screen 6 in place of format E. However, format C remains available on screen 2 for the other crew member.

Figure 10:
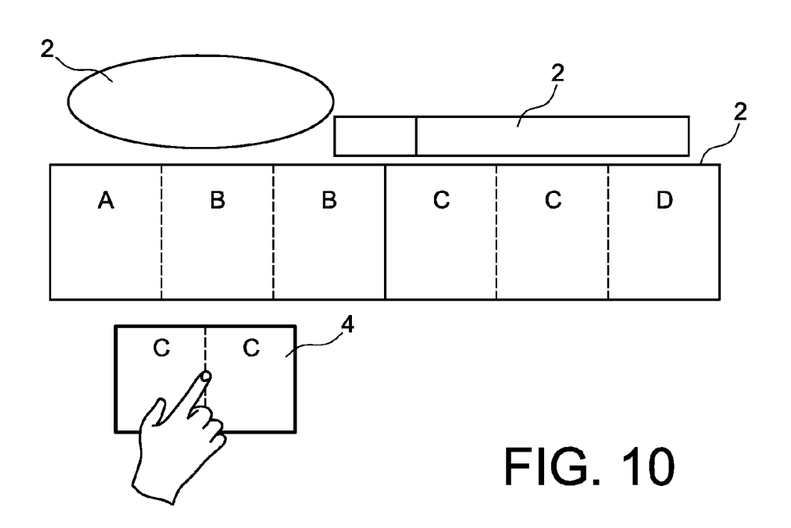
Figure 11:
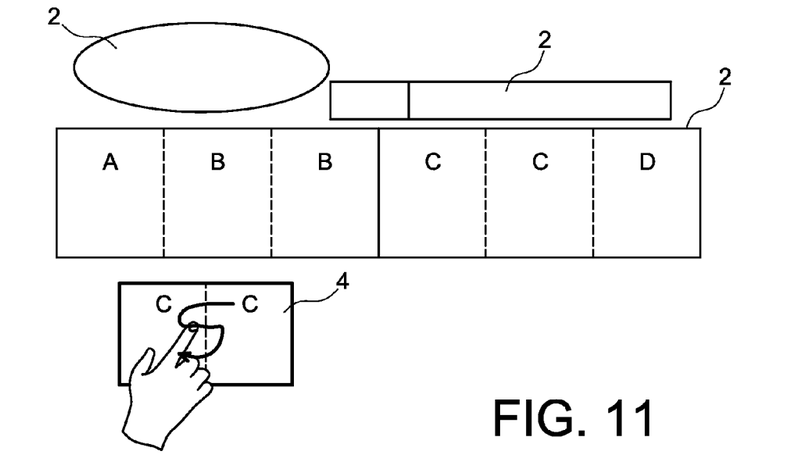
Figure 12:
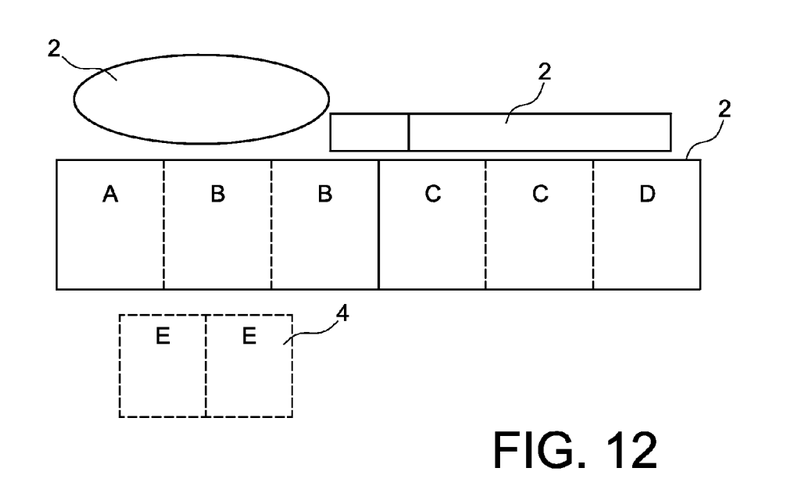

At the end of the interaction with the widget contained in format C the user may delete this format from screen 6 of DMCI 4 by touching the screen with at least three fingers to initiate the deletion (FIG. 10). The deletion is then activated by a gesture in the shape of the letter S (FIG. 11). At the end of this gesture the configuration of the cockpit instrument panel is modified to take account of this deletion. Initial format E is once again displayed on screen 6 (FIG. 12).

DMCI 4 may be used as a remote control enabling a remote configuration to be accomplished, consisting in assigning formats to screens 2 of the cockpit or to other DMCIs 4a and 4b. This lets a pilot share a display format displayed on their DMCI 4, either by transferring it to a shared screen 2, or by transferring it to the DMCI of another crew member.

Figure 13:
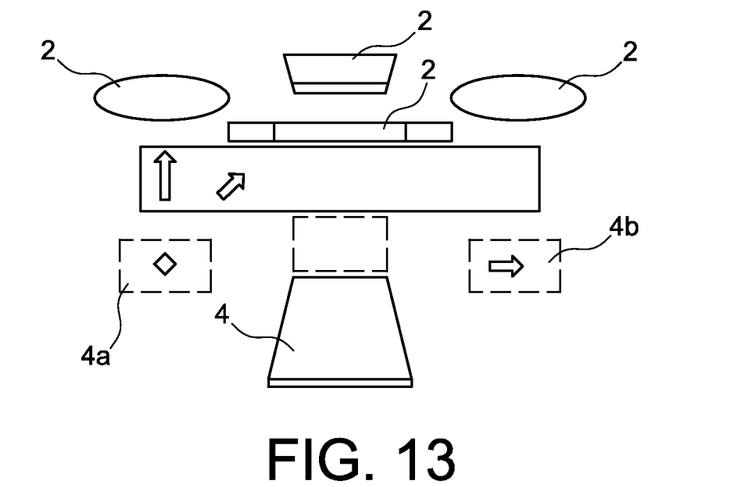
FIGS. 13 to 15 illustrate schematically the use of the mobile remote control and interaction device of FIG. 2 as a device for configuring fixed or mobile remote display screens.
Figure 14:
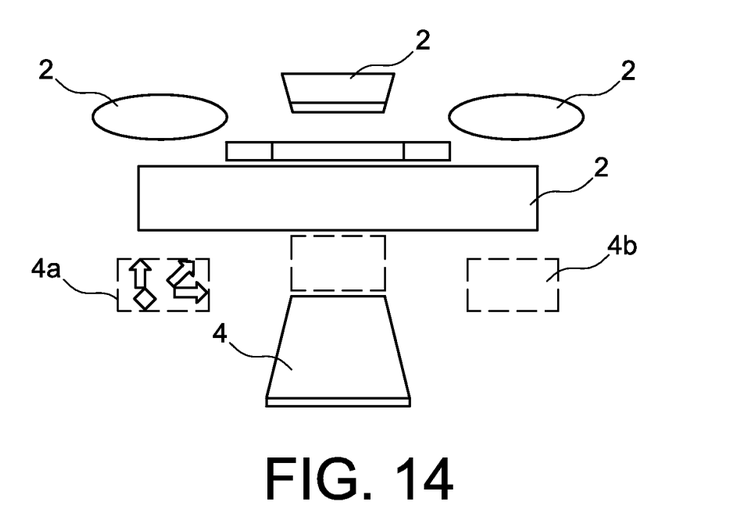

The principle of transfer by gesture is illustrated by FIGS. 13 and 14.

A format is transferred from a DMCI 4 to a screen or to another DMCI 4a, 4b by identical gestures made in the direction opposite to that of the gestures used for transferring a format from a screen or another DMCI 4a, 4b to DMCI 4, described with reference to FIGS. 4 and 5.

Figure 15:
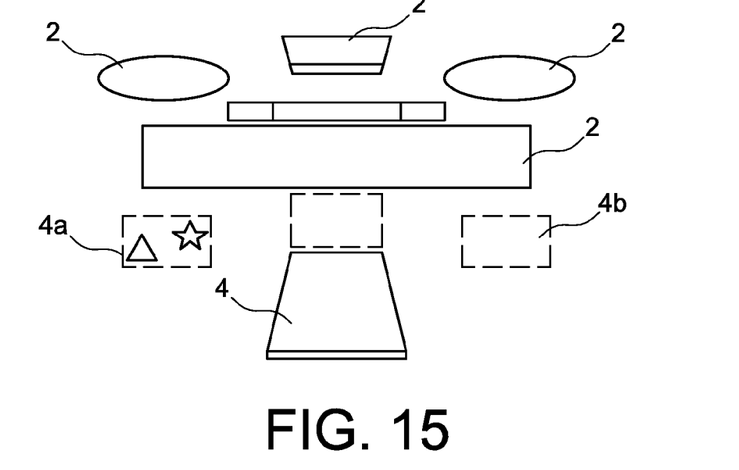

Use of DMCI 4 as a remote configuration control is illustrated by FIG. 15.

The configuration function is initialised by the same gesture as described above to accomplish a format transfer to DMCI 4. These actions include a query of a configuration interface giving a global outline of the flight deck configuration, and access to all the displayable formats, a transfer to DMCI 4 of the format which the pilot wishes to share. Modification of the format on the remote screen is controlled from the configuration interface.

Figure 16:
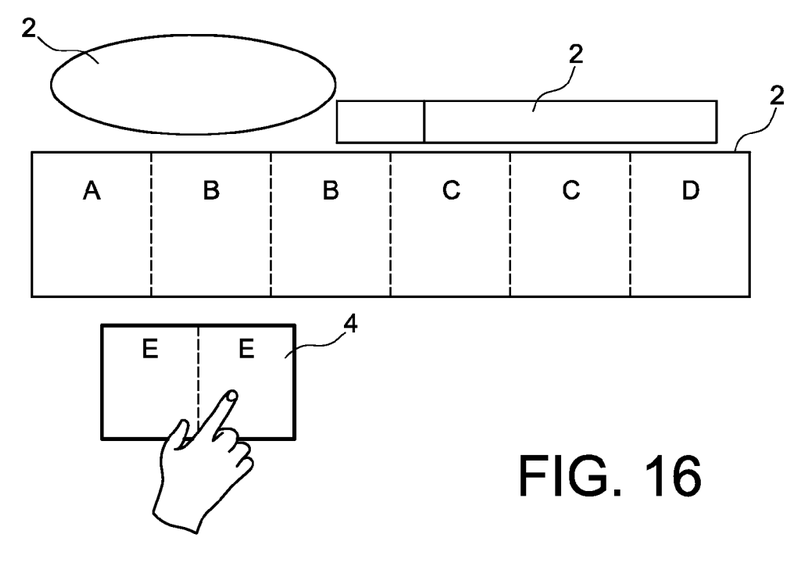
FIGS. 16 to 18 illustrate schematically a preferred embodiment of for transferring a format from a mobile remote control and interaction device according to the invention to a fixed or mobile display screen, in order to configure these screens.
Figure 17:
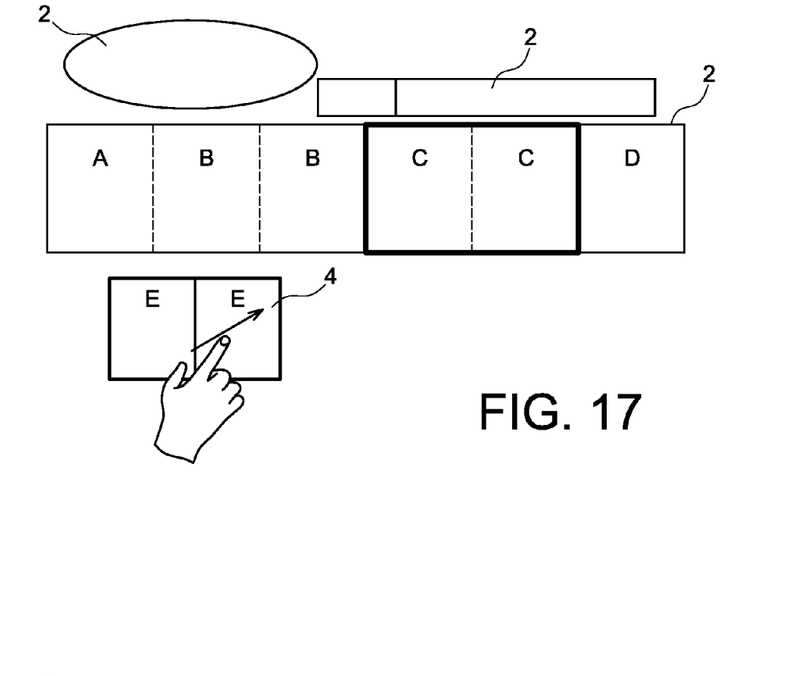
Figure 18:
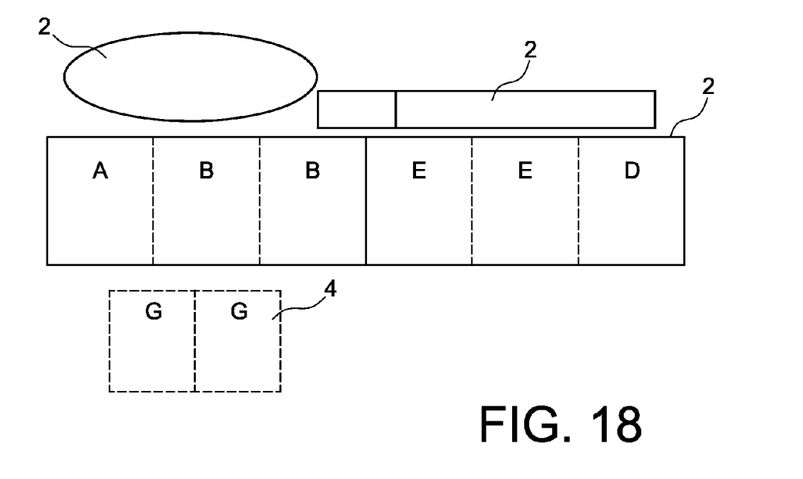

FIGS. 16 to 18 illustrate schematically the transfer of format E, displayed on screen 6 of DMCI 4, to a screen 2 or to another DMCI 4a, 4b. In this example, after the transfer format E will occupy the position of format C. To accomplish this the user activates the transfer by a touch contact on screen 6 of DMCI 4, preferably using three fingers (FIG. 16), and then makes a sliding movement in the direction of the position of window C (FIG. 17). The user confirms the transfer in the event of success, or cancels it in the event of failure. After format E has been transferred it is replaced on screen 6 of DMCI 4 by format G, which was previously displayed on this screen 6.

DMCI 4 lets the pilots interact with all the cockpit screens in comfortable positions in all the navigation phases by means of mobility. This device also enables the crew members to exchange remotely all types of information (navigation, piloting, system management, etc.).

The invention claimed is:

1. A mobile device for remote control and interaction with a display system of an aircraft cockpit including several screens able to display at least one window including at least one control widget and/or at least one signal providing information concerning the status of an on-board system of the aircraft, wherein the mobile device comprises:
   a touchscreen; and
   a computer configured, by virtue of a computer program recorded on a recording medium, to:
   display an initial window downloaded from an initial screen of the said display system on the touchscreen of the mobile device;
   download at least one window displayed on at least one of the screens of the said display system so as to interact remotely with the interactive widget contained in the downloaded window by the touchscreen and/or to display the signal providing the information concerning the status of the aircraft's on-board system on the touchscreen, wherein the at least one window displaces the initial window on the touchscreen of the mobile device and the at least one window remains displayed on the at least one of the screens of the said display system, and wherein the downloading of the window from the at least one of the screens to the touchscreen is controlled from the mobile device by a first sliding movement of a user's fingers on the touchscreen of the mobile device, wherein the first sliding movement is accomplished by using at least three fingers, and wherein the at least one screen is selected from the several screens based on position and orientation of the mobile device in the cockpit and a first direction of the first sliding movement; and
   delete the at least one window from the touchscreen of the mobile device by a second sliding movement of the user's fingers on the touchscreen of the mobile device and, in response, restore the display of the initial window on the touchscreen of the mobile device, wherein the second sliding movement is accomplished by using the at least three fingers and is distinct from the first sliding motion;
   wherein the computer is configured to transfer the downloaded window with at least one screen of the display system and at least one second mobile control and interaction device so as to interact remotely with the interactive widget contained in the said window from the said second mobile control and interaction device, and to display the signal providing information concerning the status of the aircraft's on-board system on the said second mobile control and interaction device.

2. The mobile device of claim 1, where the first direction of the first sliding movement is in a direction opposite the position of the at least one screen relative to the position and orientation of the mobile device in the cockpit.

3. The mobile device of claim 1, wherein the exchange of the downloaded window between the first mobile control and interaction device, the screen, and the second mobile control and interaction device is controlled by a second specific sliding movement, taking into account the initial and final relative positions of the display surfaces of the window in question.

4. The mobile device of claim 1, wherein the said window is downloaded via a configuration man-machine interface giving access to all the configuration actions to download a window which may be displayed on the display system screen of an aircraft cockpit, or on a second mobile control and interaction device.

5. The mobile device of claim 1, including at least one control enabling a cursor to be moved within a display window and also from one window to another.

6. The mobile device of claim 5, including at least one device for activating an action predefined by a widget designated by the cursor.

7. The device of claim 1, wherein the mobile device is configured so that the actions of control or display are given by one or two fingers, and wherein the second sliding movement comprises a gesture in the shape of a letter.

8. The device of claim 1, comprising non-virtual control buttons configured to give direct access for functions for managing screen configurations.

9. A method for remote interaction with a display system of an aircraft cockpit including multiple screens able to display at least one interaction window including at least one control widget and/or one signal providing information concerning the status of a system under control, the method comprising:
   displaying, on a touchscreen of a mobile control and interaction device, an initial window downloaded from an initial screen of the said display system;
   detecting, on the touchscreen of the mobile control and interaction device, a first sliding movement of a user's fingers on the touchscreen of the mobile control and interaction device, wherein the first sliding movement is accomplished by using at least three fingers;
   in response to detecting the first sliding movement, transferring at least one window displayed on at least one of the said screens of the said display system to a mobile control and interaction device so as to interact, remotely, from the said mobile control and interaction device, with the interactive widget contained in the transferred window, and/or to display the signal providing information concerning the status of the aircraft's on-board system on the said mobile control and interaction device, wherein the at least one screen is selected from the multiple screens based on position and orientation of the mobile device in the cockpit and a first direction of the first sliding movement, wherein the at least one window displaces the initial window on the touchscreen of the mobile device and the at least one window remains displayed on the at least one of the screens of the said display system;
   transferring the downloaded window with at least one screen of the display system and at least one second mobile control and interaction device so as to interact remotely with the interactive widget contained in the said window from the said second mobile control and interaction device, and displaying the signal providing information concerning the status of the aircraft's on-board system on the said second mobile control and interaction device; and
   deleting the at least one window from the touchscreen of the mobile device by a second sliding movement of the user's fingers on the touchscreen of the mobile device and, in response, restoring the display of the initial window on the touchscreen of the mobile device, wherein the second sliding movement is accomplished by using the at least three fingers and is distinct from the first sliding motion.

10. The method of claim 9, comprising exchanging the said downloaded window between the mobile control and interaction device, the screen and at least one second mobile control and interaction device.

11. A computer program recorded on a non-transitory recording medium, containing instructions that, when executed by computer, cause the computer to perform a method for remote interaction with a display system of an aircraft cockpit including multiple screens able to display at least one interaction window including at least one control widget and/or one signal providing information concerning the status of a system under control, the method comprising:
   displaying, on a touchscreen of a mobile control and interaction device, an initial window downloaded from an initial screen of the said display system;
   detecting, on the touchscreen of the mobile control and interaction device, a first sliding movement of a user's fingers on the touchscreen of the mobile control and interaction device, wherein the first sliding movement is accomplished by using at least three fingers;
   in response to detecting the first sliding movement, transferring at least one window displayed on at least one of the said screens of the said display system to a mobile control and interaction device so as to interact, remotely, from the said mobile control and interaction device, with the interactive widget contained in the transferred window, and/or to display the signal providing information concerning the status of the aircraft's on-board system on the said mobile control and interaction device, wherein the at least one screen is selected from the multiple screens based on position and orientation of the mobile device in the cockpit and a first direction of the first sliding movement, wherein the at least one window displaces the initial window on the touchscreen of the mobile device and the at least one window remains displayed on the at least one of the screens of the said display system;
   transferring the downloaded window with at least one screen of the display system and at least one second mobile control and interaction device so as to interact remotely with the interactive widget contained in the said window from the said second mobile control and interaction device, and displaying the signal providing information concerning the status of the aircraft's on-board system on the said second mobile control and interaction device; and
   deleting the at least one window from the touchscreen of the mobile device by a second sliding movement of the user's fingers on the touchscreen of the mobile device and, in response, restoring the display of the initial window on the touchscreen of the mobile device, wherein the second sliding movement is accomplished by using the at least three fingers and is distinct from the first sliding motion.

12. An aircraft including a cockpit fitted with a display system able to display at least one window including at least one control widget and/or at least one signal providing information concerning the status of an on-board system of the aircraft, wherein the aircraft includes a remote mobile control and interaction device comprising:
   a touchscreen; and
   a computer configured, by virtue of a computer program recorded on a recording medium, to:
   display an initial window downloaded from an initial screen of the said display system on the touchscreen of the mobile device;
   download at least one window displayed on at least one of the screens of the said display system so as to interact remotely with the interactive widget contained in the downloaded window by the touchscreen and/or to display the signal providing the information concerning the status of the aircraft's on-board system on the touchscreen, wherein the at least one window displaces the initial window on the touchscreen of the mobile device and the at least one window remains displayed on the at least one of the screens of the said display system, and wherein the downloading of the window from the at least one of the screens to the touchscreen is controlled from the mobile device by a first sliding movement of a user's fingers on the touchscreen of the mobile device, wherein the first sliding movement is accomplished by using at least three fingers, and wherein the at least one screen is selected from the several screens based on position and orientation of the mobile device in the cockpit and a first direction of the first sliding movement; and
   delete the at least one window from the touchscreen of the mobile device by a second sliding movement of the user's fingers on the touchscreen of the mobile device and, in response, restore the display of the initial window on the touchscreen of the mobile device, wherein the second sliding movement is accomplished by using the at least three fingers and is distinct from the first sliding motion;
   wherein the computer is configured to transfer the downloaded window with at least one screen of the display system and at least one second mobile control and interaction device so as to interact remotely with the interactive widget contained in the said window from the said second mobile control and interaction device, and to display the signal providing information concerning the status of the aircraft's on-board system on the said second mobile control and interaction device.

* * * * *